July 2, 1935.　　　K. H. CONLEY　　　2,006,913
CLUTCH THROWING MECHANISM
Filed Oct. 22, 1932　　　2 Sheets-Sheet 1

INVENTOR.
KURT H. CONLEY
BY
ATTORNEY

July 2, 1935.  K. H. CONLEY  2,006,913
CLUTCH THROWING MECHANISM
Filed Oct. 22, 1932  2 Sheets-Sheet 2

INVENTOR.
KURT H. CONLEY
BY
ATTORNEY.

Patented July 2, 1935

2,006,913

UNITED STATES PATENT OFFICE 2,006,913

CLUTCH THROWING MECHANISM

Kurt H. Conley, Bridgeport, Conn., assignor to The Bullard Company, a corporation of Connecticut Application October 22, 1932, Serial No. 639,147

12 Claims. (Cl. 192—56)

The invention relates to a clutch throwing mechanism and is here shown by way of illustration as applied to a chuck wrench. Obviously, the objects of the invention, as set forth in its application to a chuck wrench, are applicable to equivalent mechanisms.

It is among the prime objects of the invention to provide a simple, efficient, safe and economical power means for opening and closing the jaws of a chuck.

Another object is to provide an improved chuck operating wrench incorporating power means in a compact mechanism which will be readily applicable to existing machinery and equally well suited to incorporation in new machines.

Another object is to provide a power chuck wrench which may be easily controlled and operated by an unskilled operator and which may be readily and accurately adjusted to control the pressure to which the jaws may be tightened.

Another object of the invention is to provide a power chuck wrench which is so designed as to automatically prevent strain or overstressing of the parts and which will also act to prevent injury to the work through the application of excess pressure thereto from the chuck jaws.

A further object is to provide a substantially automatically acting power chuck wrench which by minimum control will automatically operate to move the chuck jaws against a work piece up to a predetermined pressure and which may be operated to withdraw the jaws to release the work.

A further object is to provide in a chuck wrench means for insuring disengagement of the wrench head from the chuck at the termination of the chucking operation, thereby insuring against rupture of the parts through possible inadvertent leaving of the wrench head in the chuck socket.

Numerous other objects of the invention relate to structural details which combine to provide an inexpensively built and operated mechanism for carrying out the foregoing desiderata.

In that form of the invention herein disclosed, by way of illustration, the mechanism includes a source of power, which may be combined with means such as a fly wheel or the like for building up and maintaining a constant and sufficient torque, which may thus be derived from a light motor. A drive shaft is operated from the source of power and a driven shaft is arranged to be periodically driven in either forward or reverse direction through the medium of a clutch which may be shifted by a manually controlled spring actuated shifting arm, thus to relieve the operator of the necessity of exerting himself in the shifting operation. A shifting pin under spring tension, may be provided for the arm, the tension of which may be released for the shifting movement through the deflection of the manual lever. The clutch is also designed to be self-actuating under predetermined torque so as to automatically throw itself into neutral position when the pressure actuating the jaws has achieved a predetermined maximum. The present embodiment of the invention also incorporates a lost motion connection between the wrench head and its operating shaft whereby the head may be manually adjusted both axially and angularly for setting the head in the wrench socket of the chuck, the structure being also arranged to permit the head to be automatically withdrawn from the socket subsequent to the chucking operation in the event of the chuck moving from position for operation by the wrench.

In the drawings

Figures 1, 2:
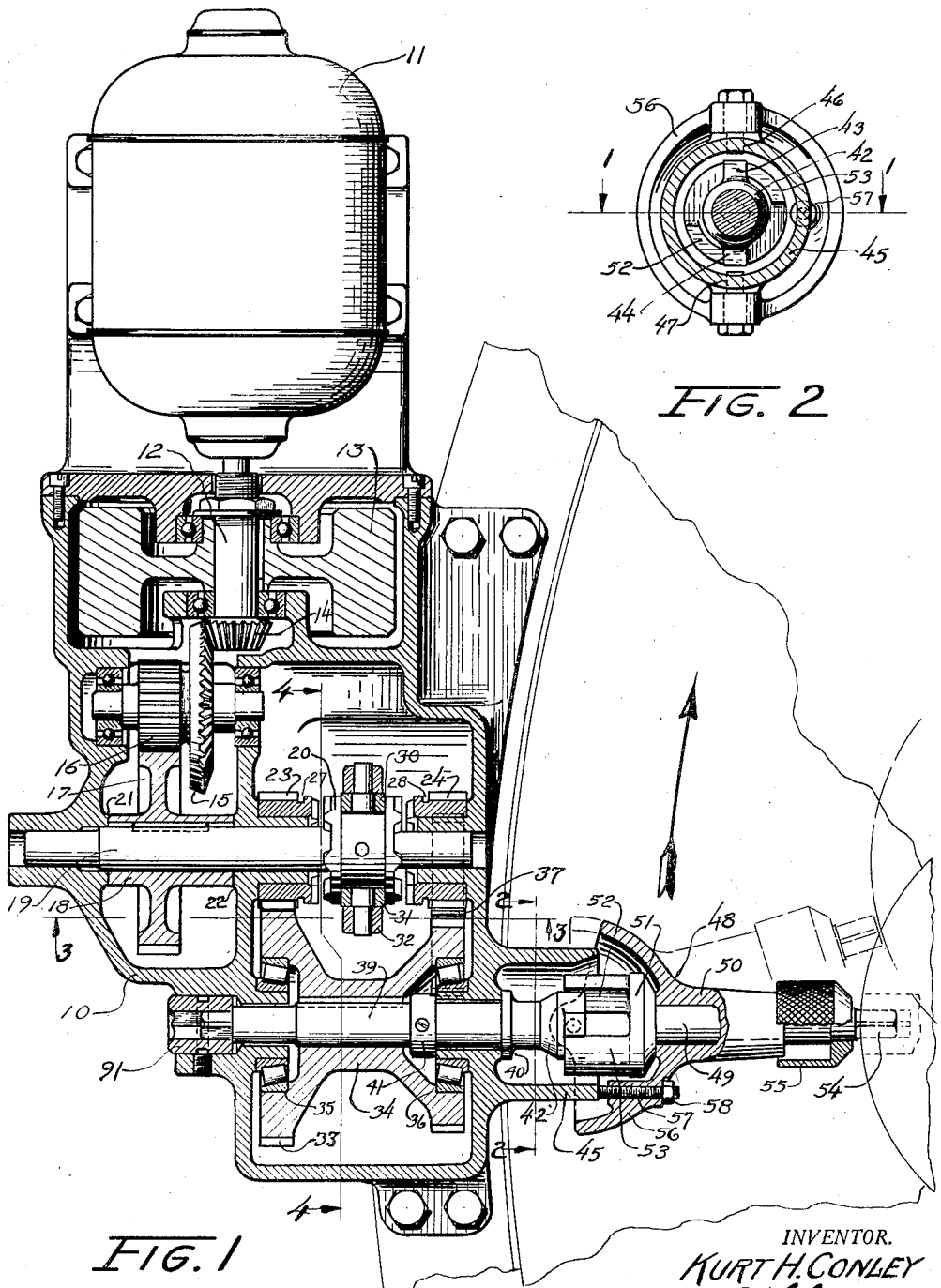
Fig. 1 is a horizontal section taken on line 1—1 of Figs. 2, 3 and 4, which shows my invention as applied to the loading station of a multiple spindle indexing machine.
Fig. 2 is a vertical section taken on line 2—2 of Fig. 1 and particularly illustrates the safety device for the chuck wrench proper.
Figure 3:
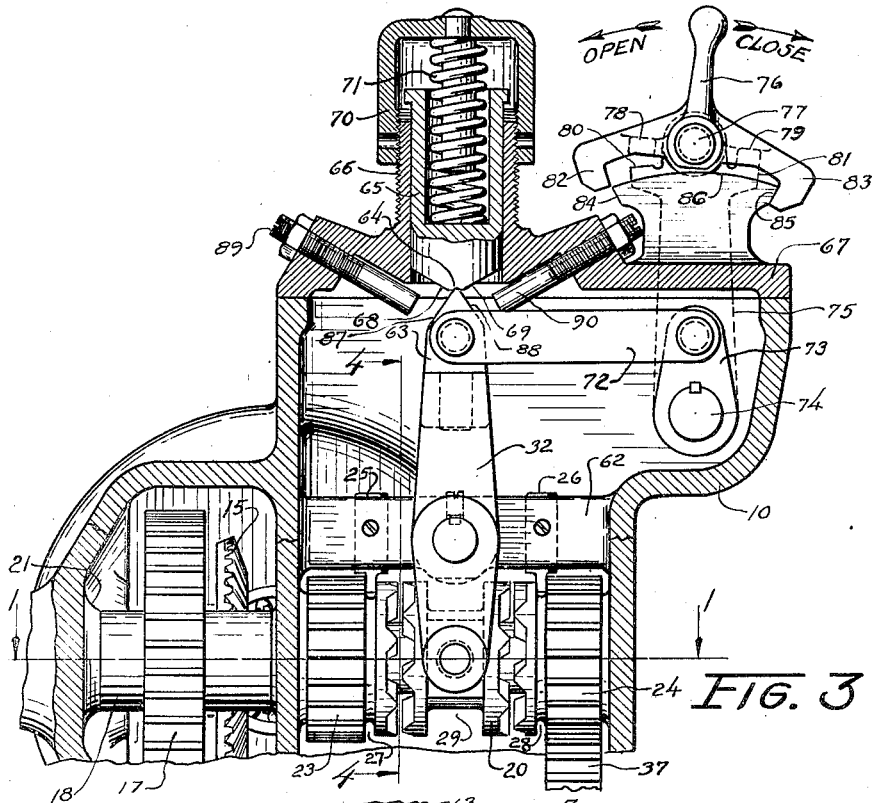
Figure 4:
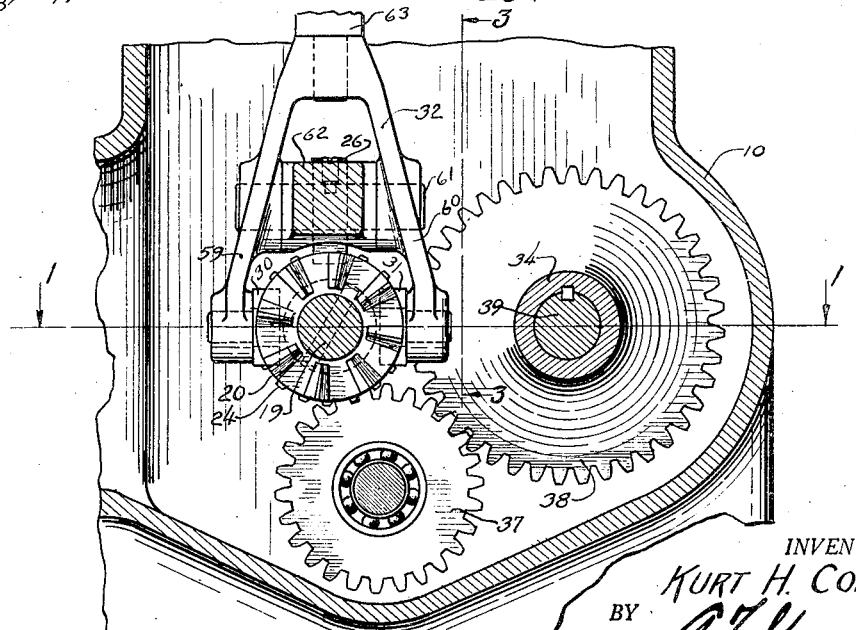

Fig. 3 is an enlarged sectional elevation taken on line 3—3 of Figs. 1 and 4, and Fig. 4 is an enlarged sectional elevation taken on line 4—4 of Figs. 1 and 3.

In the illustrative embodiment of the invention herein shown, the parts of the mechanism are held by or enclosed within a frame 10 rigidly fixed to the base of the machine tool as shown in Fig. 1. A suitable source of power such as a motor 11 drives the device constantly, it being directly connected to a shaft 12 upon which is keyed flywheel 13. It is contemplated that, in some applications of the invention, power might be delivered to the device through various other transmitting means such as a belt and pulleys, chain and sprockets or a flexible shaft. The flywheel 13 is not an indispensable element and may be omitted or may be of such form as to, itself, constitute the rotor of a pneumatic, hydraulic or electrical prime mover.

A bevel pinion 14 on the shaft 12 meshes with a bevel gear 15 on the hub of which is a spur pinion 16 meshing with a spur gear 17. Within the hub 18 of the spur gear 17 is slidably keyed a shaft 19 on which is fixed a double clutch member 20. The hub 18 is confined from axial movement by the shoulders 21 and 22 of the frame.

The above enumerated gears serve to reduce the speed of the mechanism and to increase the torque delivered by the shaft 12 to the speed and torque on the shaft 19 most suitable for the proper performance of the device. The gearing for this purpose might vary in its structure to suit different applications of the invention or be omitted entirely, in which case power might be applied more directly to the shaft 19.

Clutch pinions 23 and 24 are loosely mounted co-axially with the shaft 19 at either side of the double clutch member 20 and upon suitable bearings in the frame and retained in their proper spaced position by the shoulders of their respective bearings and by guides 25 and 26 which engage in grooves 27 and 28 respectively in the clutch pinions. The double clutch member 20, best shown in Figs. 3 and 4, has interposed between its clutch toothed ends an annular groove 29 in which fit shoes 30 and 31 carried by a shifting fork 32 for the purpose of shifting the double clutch member into engagement with either of the clutch pinions as desired. The gear teeth of the clutch pinion 23 mesh directly with the large gear 33 of the double gear 34 mounted in the bearings 35 and 36 in the frame. The gear teeth of clutch pinion 24 mesh with an intermediate gear 37 which in turn meshes with the small gear 38 of the double gear, thus to provide selective forward or reverse drive for the double gear.

A shaft 39 is keyed to the double gear 34 and projects through the wall of the frame toward the machine, being restrained axially by its integral shoulder 40 and a collar 41, and terminates in an enlarged driving head 42 having on its periphery two driving lugs 43 and 44 diametrically opposite each other.

Referring to Figs. 1 and 2, a hollow cylindrical projection 45 of the frame surrounds the driving head 42 and carries on a vertical axis coincident with the plane described by the center of the driving lugs, trunnion bearings 46 and 47 upon which swings in a horizontal plane the wrench holder 48. The wrench 49 is mounted for rotation and limited axial movement in a cylindrical bearing portion 50 of the wrench holder and has a bi-sectored hollow cylindrical driving head 51, the sectors 52 and 53 of which engage with and are driven by the driving lugs 43 and 44. The chuck engaging head 54 of the wrench is shown herein squared to fit into hollow square sockets which constitute the jaw operating means of the chuck itself.

While this is a widely used form, it will be apparent that any suitable connection might be used to engage the wrench with a jaw operating mechanism. A knurled collar 55 is provided for inserting the wrench head, it being necessary first to rotate the same to bring the squared end into registration with the socket, the shape of the sectors 52 and 53 being such as to allow sufficient rotation and secondly to move the wrench axially into engagement.

A hollow hemispherical portion 56 of the wrench holder surrounds the outer edge of the cylindrical projection 45 and is designed to protect the contained parts from interference and clogging by chips which are generally present in considerable quantity on the types of machinery to which this invention might be suitably applied. Such enclosing of moving parts also affords protection of the operator from injury.

The construction of the wrench holding parts, just described, forms a driving joint capable of being articulated in a horizontal plane, it being readily apparent from Fig. 1 that this feature of my invention provides for the withdrawal of the wrench head in case it is left in engagement with the chuck mechanism until the indexing of the machine tool in the direction of the large arrow moves the engaged chuck away. The relative position of the wrench and chuck at the instant of final disengagement is shown by light dash lines.

A screw 57 locked by a nut 58 provides an adjustable stop for re-aligning the articulated parts into a proper driving relationship.

Having described in detail the parts designed to deliver the necessary torque from the power source to the chuck socket, it now remains to set forth the means by which this torque is controlled, measured, disengaged and reversed.

By virtue of the intermediate gear 37 interposed between the clutch pinion 24 and the small gear 38 of the double gear, there may be imparted to the chuck wrench either, what for convenience will be termed a forward or a reverse direction of rotation for either closing or opening the jaws of the chuck in accordance with which of the clutch pinions 23 and 24 respectively, the double clutch member 20 has been shifted into engagement.

The shifting fork 32 is structually a bifurcated lever, the arms 59 and 60 of which embrace the double clutch member and are fulcrumed at about their mid-length on the pin 61 secured in a web 62 of the frame. At their upper ends the arms 59 and 60 are united and bored to hold a pointed shoe 63. The slightly rounded edge of this shoe is shown held engaged in a very shallow detent groove 64 across the center of the lower face of a spring-urged arrow head plunger 65 slidably held in an externally threaded bearing 66 projecting from the frame cover 67. An adjustment cap 70 fits upon the threaded bearing 66 and holds in adjustable compression a spring 71 which constantly urges the plunger downwardly against the shoe 63 of the shifting fork which, as shown clearly in Fig. 3, is holding the double clutch member in its central or disengaged position.

A link 72 connects the shoe 63 with a lever 73 keyed to a shaft 74 which passes through its bearing in the frame to the exterior and has keyed to it an operating lever 75. A handle 76 is fulcrumed at 77 to the operating lever and is adapted to receive a rocking motion relative thereto, said rocking motion being limited by the projections 78 or 79 of the handle striking the shoulders 80 or 81 respectively of the operating lever. The handle 76 has spreading hooked arms 82 and 83, the hook surfaces of which may engage the end surfaces 84 and 85 of a sector 86 formed as a part of the frame cover 67.

In operation, a relatively light pressure on the handle 76 in the direction indicated as "close" in Fig. 3 will first rock the said handle into the position shown, disengaging the hook of the arm 82 from the end surface 84 of the sector, and placing the projection 79 against the shoulder 81 of the operating lever 75. It will be evident that further movement of the handle will, through the link 72, disengage the point of the shoe 63 from the shallow groove in the plunger and bring it into contact with a slanting cam surface 69 of the plunger, whereupon the movement of the shoe and of the fork 32 will be accelerated by the downward pressure of the plunger acting upon the pointed shoe through the slanting cam surface 69. The action just described will result in the engagement of the double clutch member with the clutch pinion 23 and a forward direction of rotation of the driven mechanism will ensue.

If the handle be moved in the opposite direction, the rocking motion will first disengage the handle of the arm 83 from the end surface 85 of the sector, further motion resulting in the engagement of the double clutch member with the clutch pinion 24 and the imparting of a reverse direction of rotation to the driven mechanism.

The pointed shoe 63 is provided with flange surfaces 87 and 88 which, as the shifting fork completes its motion in either direction, strike the adjustable stop screws 89 and 90, thus relieving the engaging clutch teeth from the direct impact, the parts including the handle and operating lever, having attained considerable momentum during the engaging motion.

The engaging surfaces of the clutch teeth of the double clutch member and of the clutch pinions have an angular relationship to their plane of rotation, being portions of a helix. By this construction the double clutch member may engage and drive one of the clutch gears until the chuck mechanism reaches its limits of movement in either direction, whereupon resistance will build up whereby further rotation of the double clutch member results in a helically sliding action of the engaged clutch teeth thus imparting to the double clutch member an axial translation toward the central disengaged position.

This translation is accomplished against the resistance of the spring 71 through the plunger and one of its slanting cam surfaces acting upon the pointed shoe of the shifting fork, and the reaction of this resistance is a measure of the torque applied to the chuck wrench.

In cases wherein work is held in the chucks by inward jaw pressure, stops are to be provided in the chuck which will limit the outward jaw movement and thus disengage the operating mechanism. Conversely, and for the same purpose, stops may be provided to limit the inward jaw movement in cases wherein the work is gripped by internal application of the jaws.

The disengaging motion of the double clutch member being accomplished very quickly, a considerable speed and momentum is attained by the connected parts which would tend to carry the pointed shoe across its groove and into contact with the opposite slanting cam surface thus immediately re-engaging the double clutch member and operating the mechanism and the chuck in the direction opposite that just previously set by the operator. In correct operation, the pointed shoe must come to rest in the shallow groove of the plunger after each disengagement of the clutch teeth. This functioning is insured by the construction of the operating handle previously described. Fig. 3 shows the parts as having just previously been disengaged from the "close" position. It will be noted that the hook surface of arm 83 has engaged against the surface 85 thus preventing positively any further motion. The hook surface of arm 82 acting against the surface 84 would function in the same manner in stopping the parts in the central position after their disengagement from the "open" position.

The end of the shaft 39 opposite the chuck wrench and toward the operator carries a wrench socket 91 into which an ordinary hand chuck wrench may be inserted for emergency hand operating in event of power failure or other disability of the power mechanism.

From the foregoing it will be seen that the device provides a simple, easily operated, controlled and adjusted mechanism which will be economical and safe in operation. Obviously, numerous changes and modifications may be resorted to, for instance the gear formation clutching arrangement and control mechanism may be varied and other power means may be substituted or if desired manual power may be applied to the shaft 39, all without departing from the spirit or scope of the invention as outlined in the appended claims.

Having thus set forth the nature of my invention, what I claim is:

1. In a clutch throwing mechanism, for controlling the movement of a double faced clutch member, the combination of a clutch controlling arm having an arrow head, a co-operating arrow head, having a recess therein for maintaining the arm in neutral position, and manual means for moving said arm from neutral position, said means including a latch mechanism for retaining said manual means against accidental movement in the opposite direction after its movement to neutral position.

2. In a clutch throwing mechanism, for controlling the movement of a double faced clutch member, the combination of a clutch controlling arm having an arrow head, a co-operating arrow head, having a recess therein for maintaining the arm in neutral position, said throwing mechanism including a latch mechanism for retaining it against accidental movement in the opposite direction after its movement to neutral position, and manual means for moving said mentioned means in the opposite direction to automatically release said mechanism.

3. In a pivoted clutch controlling arm, the combination therewith of a pivoted handle, therefor, latch mechanism carried by said handle adapted to engage said arm against accidental movement in one direction and to automatically release said arm for movement in that direction upon manipulation of said arm in said direction.

4. In a torque responsive clutch control mechanism, including spring means for retaining the clutch in engaged position, the combination of manually operable means for restricting the movement of the clutch in response to the application of torque, said means being operable to retain said clutch in neutral position until manual manipulation of said means.

5. In a clutch controlling mechanism, including an arrow point having a neutral groove therein, and a corresponding arrow head adapted to be received within said groove to retain said mechanism in neutral position, of manually operable means to retain said arrow point in said neutral groove.

6. In a clutch controlling mechanism, including an arrow point having a neutral groove therein, and a corresponding arrow head adapted to be received within said groove to retain said mechanism in neutral position, of manually operable means to retain said arrow point in said neutral groove, said means being automatically operable upon manual manipulation to shift said clutch.

7. In a clutch controlling mechanism, including an arrow point having a neutral groove therein, and a corresponding arrow head adapted to be received within said groove to retain said mechanism in neutral position, of manually operable means to retain said arrow point in said neutral groove, said means being automatically operable upon manual manipulation to shift said clutch, and including a pivoted latch member.

8. In a clutch controlling mechanism, including an arrow point having a neutral groove therein, and a corresponding arrow head adapted to be received within said groove to retain said mechanism in neutral position, of manually operable means to retain said arrow point in said neutral groove, said means being automatically operable upon manual manipulation to shift said clutch, and including a pivoted latch member, having furcations adapted to engage stationary points on the control housing.

9. In a clutch controlling mechanism, including an arrow point having a neutral groove therein, and a corresponding arrow head adapted to be received within said groove to retain said mechanism in neutral position, of manually operable means to retain said arrow point in said neutral groove, said means being automatically operable upon manual manipulation to shift said clutch, and including a pivoted latch member, having furcations adapted to engage stationary points on the control housing, and to be released therefrom upon manual movement.

10. In a clutch mechanism, the combination of a pair of axially fixed gears, each having oppositely disposed, inclined clutch teeth, an axially movable clutch element disposed therebetween, and having oppositely disposed, co-operating, inclined clutch teeth, an operating arm for said clutch, an arrow point on said arm, a co-operating, spring urged arrow point having a neutral central groove, a manually operable arm for said first mentioned arm, a positive connection between said arms, and a latch for said manually operable arm arranged to secure said arm to retain said arrow point in said neutral groove.

11. In a clutch mechanism, the combination of a pair of axially fixed gears, each having oppositely disposed, inclined clutch teeth, an axially movable clutch element disposed therebetween, and having oppositely disposed, co-operating, inclined clutch teeth, an operating arm for said clutch, an arrow point on said arm, a co-operating, spring urged arrow point having a neutral central groove, a manually operable arm for said first mentioned arm, a positive connection between said arms, and a latch for said manually operable arm, arranged to secure said arm to retain said arrow point in said neutral groove, said latch being automatically movable by movement of said manually operable arm.

12. In a clutch mechanism, the combination of a pair of axially fixed gears, each having oppositely disposed, inclined clutch teeth, an axially movable clutch element disposed therebetween, and having oppositely disposed, co-operating, inclined clutch teeth, an operating arm for said clutch, an arrow point on said arm, a co-operating, spring urged arrow point having a neutral central groove, a manually operable arm for said first mentioned arm, a positive connection between said arms, and a latch for said manually operable arm arranged to secure said arm to retain said arrow point in said neutral groove, said latch including a handle for said manually operable arm, whereby movement thereof will release said latch.

KURT H. CONLEY.